United States Patent
Genda

(10) Patent No.: US 9,965,710 B2
(45) Date of Patent: May 8, 2018

(54) IMAGE PROCESSING APPARATUS AND NON-TRANSITORY COMPUTER READABLE RECORDING MEDIUM

(71) Applicant: Konica Minolta, Inc., Tokyo (JP)

(72) Inventor: Daisuke Genda, Kanagawa (JP)

(73) Assignee: Konica Minota, Inc., Tokyo (JP)

( * ) Notice: Subject to any disclaimer, the term of this patent is extended or adjusted under 35 U.S.C. 154(b) by 267 days.

(21) Appl. No.: 15/086,978

(22) Filed: Mar. 31, 2016

(65) Prior Publication Data
US 2016/0314599 A1 Oct. 27, 2016

(30) Foreign Application Priority Data
Apr. 21, 2015 (JP) ................................ 2015-086369

(51) Int. Cl.
| | |
|---|---|
| G06K 9/00 | (2006.01) |
| G06K 15/02 | (2006.01) |
| G06T 5/00 | (2006.01) |
| G06T 5/30 | (2006.01) |
| H04N 1/58 | (2006.01) |

(52) U.S. Cl.
CPC ......... G06K 15/189 (2013.01); G06K 15/188 (2013.01); G06K 15/1881 (2013.01); G06T 5/009 (2013.01); G06T 5/30 (2013.01); H04N 1/58 (2013.01); G06T 2207/10024 (2013.01)

(58) Field of Classification Search
CPC ....................... G06K 15/1825; G06K 15/1826
See application file for complete search history.

(56) References Cited

U.S. PATENT DOCUMENTS

| | | | | |
|---|---|---|---|---|
| 5,542,052 A | * | 7/1996 | Deutsch | G06K 15/00 345/589 |
| 6,549,303 B1 | * | 4/2003 | Trask | G06K 15/02 358/1.9 |
| 6,594,030 B1 | * | 7/2003 | Ahlstrom | G06F 17/211 358/1.15 |
| 7,724,393 B2 | * | 5/2010 | Segawa | H04N 1/58 358/1.9 |

(Continued)

FOREIGN PATENT DOCUMENTS

| | | |
|---|---|---|
| JP | 2005-341249 A | 12/2005 |
| JP | 2015-16576 A | 1/2015 |

OTHER PUBLICATIONS

Office Action in counterpart Japanese Patent Application No. 2015-086369 dated May 23, 2017 (8 pages).

*Primary Examiner* — Wesley J Tucker
(74) *Attorney, Agent, or Firm* — Osha Liang LLP

(57) ABSTRACT

An image processing apparatus including a contour extraction section which extracts a contour pixel of an object from pixels in image data that has tone values of a plurality of colors for each of the pixels; and a contour processing section which executes thinning processing of adjusting a tone value of an object color of the object and trapping processing of adjusting a tone value of a background color among tone values of colors in the contour pixel of the object which is extracted by the contour extraction section or in a contour pixel of the background of the object, wherein the contour processing section links an adjustment amount of the tone value of the background color by the trapping processing to an adjustment amount of the tone value of the object color by the thinning processing.

6 Claims, 4 Drawing Sheets

(56) References Cited

U.S. PATENT DOCUMENTS

| | | | | |
|---|---|---|---|---|
| 8,130,413 B1* | 3/2012 | Pellore | ............ | H04N 1/58 |
| | | | | 358/1.15 |
| 8,253,981 B2* | 8/2012 | Eguchi | ............ | H04N 1/58 |
| | | | | 358/1.9 |
| 8,675,257 B2* | 3/2014 | Jia | ............ | G06K 15/02 |
| | | | | 345/589 |
| 9,307,119 B2* | 4/2016 | Li | ............ | H04N 1/56 |
| 2006/0007496 A1* | 1/2006 | McElvain | ............ | G06T 11/001 |
| | | | | 358/3.27 |
| 2006/0268296 A1* | 11/2006 | McElvain | ............ | H04N 1/58 |
| | | | | 358/1.9 |
| 2008/0088643 A1* | 4/2008 | Yhann | ............ | H04N 1/58 |
| | | | | 345/629 |
| 2010/0259775 A1* | 10/2010 | Sakamoto | ............ | H04N 1/58 |
| | | | | 358/1.9 |
| 2014/0050269 A1* | 2/2014 | Li | ............ | H04N 1/56 |
| | | | | 375/240.25 |

* cited by examiner

FIG.5
| | OBJECT | BACKGROUND |
|---|---|---|
| THINNING PROCESSING ONLY | 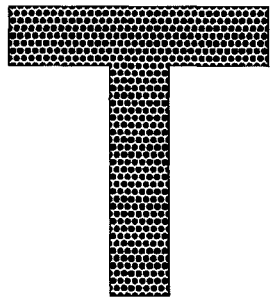 | 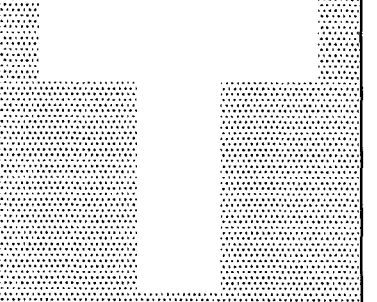 |
| TRAPPING PROCESSING ONLY | 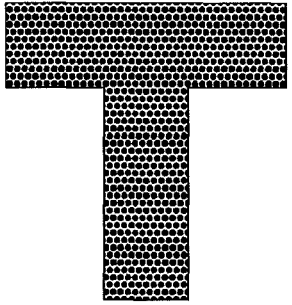 | 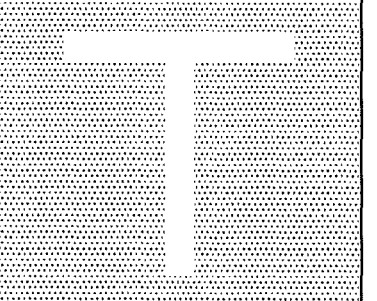 |
| THINNING PROCESSING AND TRAPPING PROCESSING | 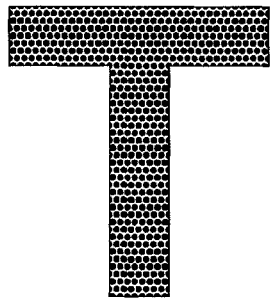 | 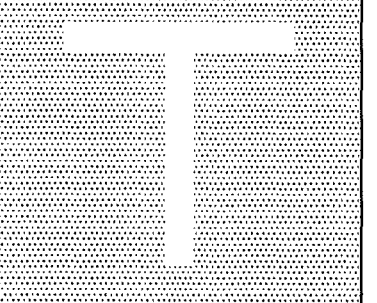 |

IMAGE PROCESSING APPARATUS AND NON-TRANSITORY COMPUTER READABLE RECORDING MEDIUM

The entire disclosure of Japanese Patent Application No. 2015-086369 filed on Apr. 21, 2015 including description, claims, drawings, and abstract are incorporated herein by reference in its entirety.

BACKGROUND OF THE INVENTION

1. Field of the Invention

The present invention relates to an image processing apparatus and a non-transitory computer readable recording medium.

2. Description of Related Art

In applications for DTP (Desktop Publishing) and such like, when an image having a color is used as a background and an object such as a character and a figure having a color different from the color of background is superposed on the background, image processing called knockout is performed in some cases, the knockout being processing of removing the object part from the background image. When the knockout is performed to an original image in which a black character is arranged on a blue background, for example, an image is generated by combining the character with the background from which the character part is removed.

In the electrophotographic method, monochromatic images are individually formed and thereafter superposed on each other at the same position on an image carrier to be transferred, and thereby, an image having a plurality of colors is formed. Since the object and the background image generated by the knockout have colors different from each other, when the positions to superpose the monochromatic images are shifted, space is possibly generated between the object and the background image. Against this problem, trapping processing is generally performed at the time of rasterizing to slightly overlap the object and the background image.

On the other hand, in a case where image formation is performed by the electrophotographic method, the line width of object such as a character and a ruled line is sometimes larger than the original line width due to a dot gain phenomenon, splattered color materials, crush and such like. In order to suppress such increase in line width, thinning processing has been performed to image data, which was generated by rasterizing, to reduce tone values of the contour of the object (for example, see Japanese Patent Application Laid Open Publication No. 2005-341249).

However, it is difficult to obtain both effects of trapping processing and thinning processing.

For example, the contour of object which was subjected to the trapping processing overlaps the background thereof, and the contour of object has a color different from the color of the object other than the contour. Thus, the contour of object cannot be detected accurately and the accuracy of thinning processing is lowered in some cases. Even if the contour of object can be detected, when tone values of the contour of object are decreased by the thinning processing, the object region is reduced to lose the portion overlapping the background. Thus, space is generated between the object and the background, and the effect of trapping processing is lost.

SUMMARY

In one or more embodiments of the present invention, both effects of thinning processing and trapping processing may be obtained.

In order to obtain the effects, according to one aspect of the present invention, there is provided an image processing apparatus including: a contour extraction section which extracts a contour pixel of an object from pixels in image data that has tone values of a plurality of colors for each of the pixels; and a contour processing section which executes thinning processing of adjusting a tone value of an object color of the object and trapping processing of adjusting a tone value of a background color that is a color of a background of the object among tone values of colors in the contour pixel of the object which is extracted by the contour extraction section or tone values of colors in a contour pixel of the background of the object, wherein the contour processing section links an adjustment amount of the tone value of the background color by the trapping processing to an adjustment amount of the tone value of the object color by the thinning processing.

In the image processing apparatus according to one or more embodiments of the invention, in a case where the contour processing section decreases the tone value of the object color among the tone values of the colors in the contour pixel of the object by the thinning processing, the contour processing section increases the tone value of the background color among the tone values of the colors in the contour pixel of the object by the trapping processing, and links an increase amount of the tone value of the background color to a decrease amount of the tone value of the object color.

In the image processing apparatus according to one or more embodiments of the invention, in a case where the contour processing section increases the tone value of the object color among the tone values of the colors in the contour pixel of the background by the thinning processing, the contour processing section decreases the tone value of the background color among the tone values of the colors in the contour pixel of the background by the trapping processing, and links a decrease amount of the tone value of the background color to an increase amount of the tone value of the object color.

In the image processing apparatus according to one or more embodiments of the invention, the contour processing section determines, as an adjustment intensity of the tone value of the background color by the trapping processing, a total of an adjustment intensity of the tone value of the object color by the thinning processing and an overlapping intensity of an object region and a background region.

In the image processing apparatus according to one or more embodiments of the invention, the contour processing section sets the overlapping intensity of the object region and the background region to be constant.

BRIEF DESCRIPTION OF THE DRAWINGS

The above and other effects, advantages and features of the present invention will become more fully understood from the detailed description given hereinbelow and the appended drawings which are given by way of illustration only, and thus are not intended as a definition of the limits of the present invention, and wherein:

FIG. 5 is a view showing a list, according to one or more embodiments, of processing results of the object and the background which are obtained when only the thinning processing is performed, when only the trapping processing is performed, and when both of the thinning processing and the trapping processing are performed.

DETAILED DESCRIPTION

Hereinafter, an image processing apparatus and an image processing contents according to one or more embodiments of the present invention will be described with reference to the drawings.

Figure 1:
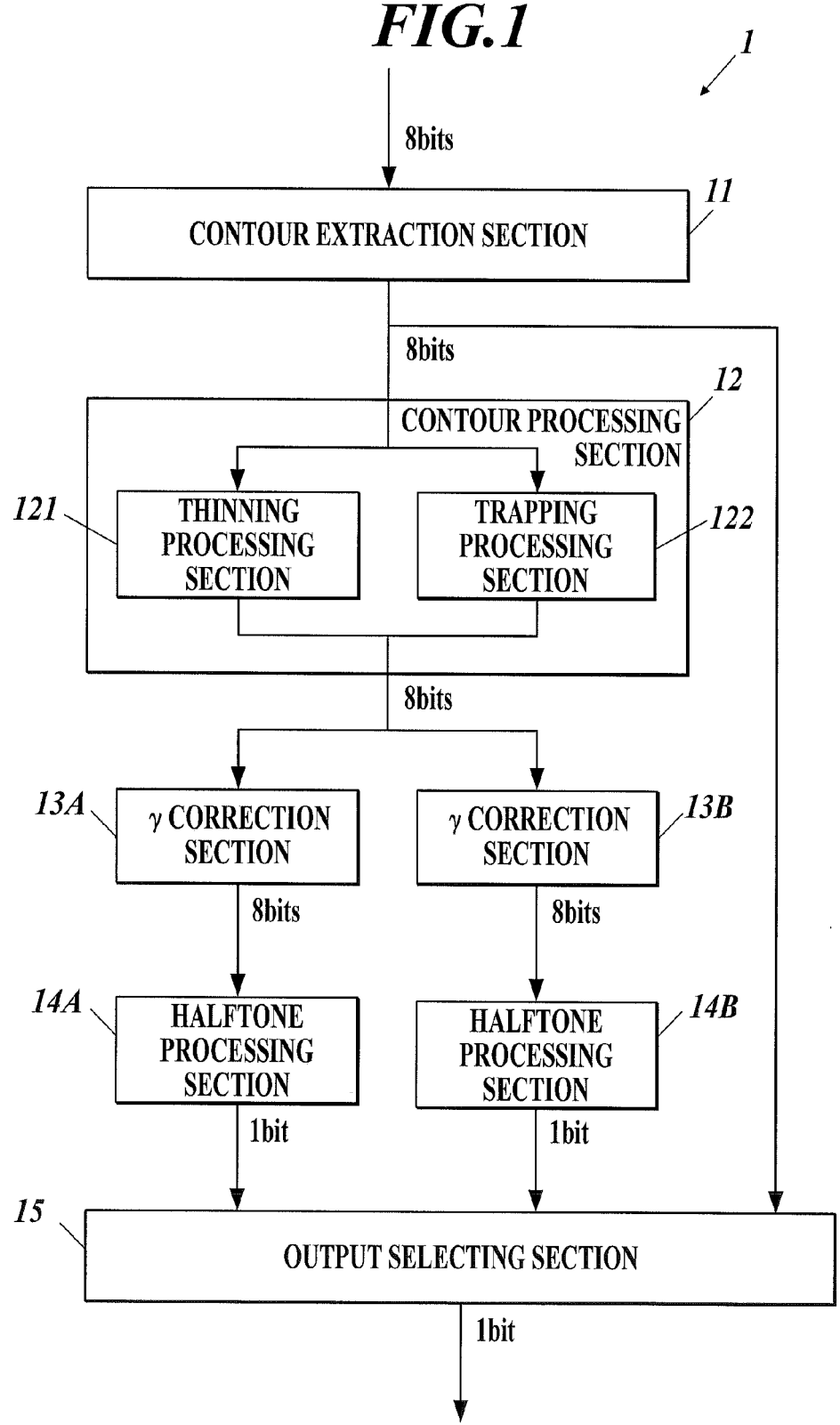
FIG. 1 is a block diagram showing a main functional configuration of an image processing apparatus according to one or more embodiments.

FIG. 1 is a block diagram showing a main functional configuration of an image processing apparatus 1 in one or more embodiments of the invention.

As shown in FIG. 1, the image processing apparatus 1 includes a contour extraction section 11, a contour processing section 12, γ (gamma) correction sections 13A and 13B, halftone processing sections 14A and 14B and an output selecting section 15.

The image processing apparatus 1 inputs bit-mapped image data which was generated by rasterizing. The bit-mapped image data is formed of a plurality of pixels, and each of the pixels has tone values of a plurality of colors, for example, the colors of C (cyan), M (magenta), Y (yellow) and K (black). The tone value is a data value expressing a gradation level of an image. For example, the tone value having the data amount of 8 bit expresses the gradation level of 0 to 255 tones.

As shown in FIG. 1, the image processing apparatus 1 inputs image data using 256 tones in which each of the pixels has a tone value of 8 bit. Then, the image processing apparatus 1 outputs image data using 2 tones in which each of the pixels has a tone value of 1 bit. The data amounts of each of the pixels in the image data when the image data is input and output are not limited to the data amounts shown in FIG. 1, and can be arbitrarily determined.

The contour extraction section 11 extracts contour pixels of the object from the pixels in the input image data. The contour pixels of the object indicate the pixels forming the contour of the object. The object is an image part such as a character (kana, alphabet and number), figure (polygon, circle and ruled line) and photograph (image stored in JPEG format), for example.

For example, the contour extraction section 11 sequentially inputs image data of 3×3 pixels centering each pixel, and determines whether the centered pixel is a contour pixel according to the differences in tone values between the pixel and the respective adjacent pixels of the pixel.

Figure 2:
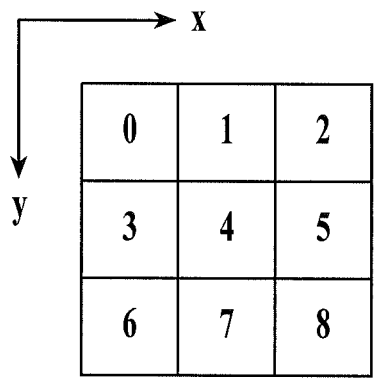
FIG. 2 is a view showing identification numbers of 3×3 pixels according to one or more embodiments.

When each of the 3×3 pixels is expressed as pixel 0 to 8 as shown in FIG. 2, the contour extraction section 11 calculates SPu[ch], SPd[ch], SPl[ch] and SPr[ch] which are the respective differences in tone values of each color between the pixel 4 which is located at the center of 3×3 pixels and the adjacent pixels 1, 7, 3 and 5 which are respectively located on the upper, lower, left and right sides of the pixel 4. The "ch" expresses each color of C, M, Y and K.

When the tone values of the pixel 4 and the adjacent pixels 1, 7, 3 and 5 for each color are respectively expressed as C4[ch], C1[ch], C7[ch], C3[ch] and C5[ch], the differences SPu[ch], SPd[ch], SPl[ch] and SPr[ch] can be expressed as follows:

$$SPu[ch]=C4[ch]-C1[ch]$$

$$SPd[ch]=C4[ch]-C7[ch]$$

$$SPl[ch]=C4[ch]-C3[ch]$$

$$SPr[ch]=C4[ch]-C5[ch]$$

The contour extraction section 11 compares SPu[ch] with SPd[ch] and compares SPl[ch] with SPr[ch] for each color. As a result of comparison, if there is at least one color satisfying SPu[ch]≠SPd[ch] or SPl[ch]≠SPr[ch], the contour extraction section 11 determines that the pixel 4 is a contour pixel since there is a difference in tone value, that is, an edge between the pixel 4 and the adjacent pixel.

If the contour extraction section 11 determines the pixel 4 as the contour pixel, the contour extraction section 11 determines an edge direction in the pixel 4. The edge direction is a direction from a smaller tone value toward a larger tone value.

First, the contour extraction section 11 calculates a visual tone value C4 of the pixel 4 as the contour pixel when the four colors of C, M, Y and K are superposed on each other by using the following expression:

$$C4=C4[C]\times Wc+C4[M]\times Wm+C4[Y]\times Wy+C4[K]\times Wk$$

Each of the Wc, Wm, Wy and Wk is a weighting coefficient which is set according to a relative luminosity, and satisfies Wc+Wm+Wy+Wk=1. For example, since Y color has a small relative luminosity compared to the other colors and K color has a large relative luminosity, the weighting coefficients can be set as Wc=Wm=2/8, Wy=1/8 and Wk=3/8.

Similarly to the above process of pixel 4, the contour extraction section 11 also calculates visual tone values C0 to C3 and C5 to C8 when the four colors of C, M, Y and K are superposed for the respective pixels 0 to 3 and 5 to 8 surrounding the pixel 4.

Next, the contour extraction section 11 obtains the differences by subtracting the respective tone values C0 to C3 and C5 to C8 of the pixels 0 to 3 and 5 to 8 from the calculated tone value C4 of the pixel 4, and determines one pixel which has the largest difference from among the pixels 0 to 3 and 5 to 8.

The contour extraction section 11 determines the edge direction P according to the one pixel, which was determined from among the pixels 0 to 3 and 5 to 8, as follows:

If the determined pixel is pixel 1, P=0
If the determined pixel is pixel 7, P=1
If the determined pixel is pixel 3, P=2
If the determined pixel is pixel 5, P=3
If the determined pixel is pixel 0, P=4
If the determined pixel is pixel 8, P=5
If the determined pixel is pixel 2, P=6
If the determined pixel is pixel 6, P=7

The following table shows edge directions expressed by the values of P that are 0 to 7. As shown in the table, there are eight edge directions P including the four directions of up, down, left and right and the four oblique directions.

TABLE 1

| P | EDGE DIRECTION |
|---|---|
| 0 | ↓ |
| 1 | ↑ |
| 2 | → |
| 3 | ← |
| 4 | ↘ |
| 5 | ↖ |
| 6 | ↙ |
| 7 | ↗ |

In a case where the thinning processing is performed for only an object of a character or a figure for which the increase in line width is easily noticeable, the contour extraction section 11 inputs attribute data indicating the attribute such as character, figure and photograph for each pixel, and may determine the contour pixel for only the pixels having the attribute of character or figure in the input attribute data.

The attribute data can be generated together with the image data at the time of rasterizing. For example, in a case where data described in PDL (Page Description Language) is rasterized to generate bit-mapped image data, the attribute can be determined as character (Text) for each pixel in an image such as kana, alphabet and number which was drawn in accordance with the description in a text code. The attribute can be determined as figure (Graphics) for each pixel in an image such as polygon, circle and ruled line which was drawn in accordance with the description in a vector format such as DXF, SVG and WMF. The attribute can be determined as photograph (Image) for an image such as a photographed image which was drawn by a file in JPEG format. The attribute data which was generated in such way may be obtained together with the image data.

Among tone values of the colors in the contour pixel of object extracted by the contour extraction section 11, the contour processing section 12 can execute the thinning processing of adjusting a tone value of an object color and the trapping processing of adjusting a tone value of a background color which is a color of a background of the object.

The contour processing section 12 can perform the thinning processing and/or the trapping processing to the image data. For example, in a case where the image data is generated by knockout of combining the object and the background from which the object is removed, the contour processing section 12 performs both of the thinning processing and the trapping processing.

Whether or not to perform such thinning processing and trapping processing may be determined by a user, or may be determined according to setting information by inputting the setting information together with the image data, the setting information indicating whether knockout was performed. Whether the knockout was performed, whether the thinning processing is necessary and such like may be determined by analyzing the image data in the contour processing section 12 or in an analysis processing section which is additionally provided.

The contour processing section 12 performs the thinning processing to the tone value of object color, and performs the trapping processing to the tone value of background color in the object. For example, the contour pixel of background is the adjacent pixel located in the opposite direction to the edge direction P of the contour pixel. Thus, among the tone values of colors in the object contour pixel, the contour processing section 12 performs trapping processing to the tone value of a color having a smaller tone value than that of the above adjacent pixel, that is, the color of the background, and performs the thinning processing to the tone value of a color having a larger tone value than that of the adjacent pixel, that is, the color of the object.

Figure 3:
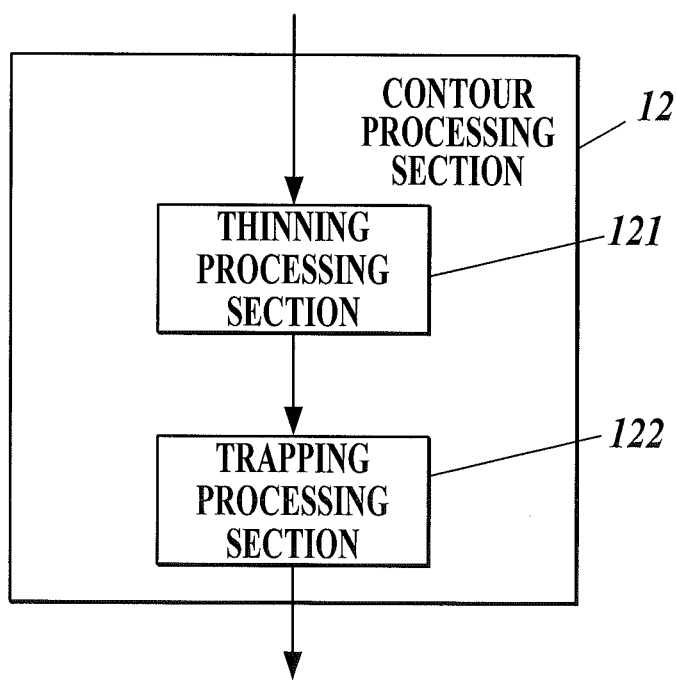
FIG. 3 is a view showing another arrangement example of a thinning processing section and a trapping processing section in a contour processing section.

As shown in FIG. 1, the contour processing section 12 includes a thinning processing section 121 and a trapping processing section 122. In a case where the thinning processing and the trapping processing can be executed in the contour processing section 12, the thinning processing section 121 and the trapping processing section 122 can be located in parallel as shown in FIG. 1, and in series as shown in FIG. 3.

The thinning processing section 121 reduces the tone value of object color from among tone values of colors included in the object contour pixel by performing weighted-averaging of the tone values in the contour pixel with the tone values of the adjacent pixel located in the opposite direction to the edge direction P determined by the contour extraction section 11. For example, in a case where the edge direction P of the object contour pixel is P=3 which is a leftward direction, since the opposite direction is rightward direction, the contour processing section 12 uses the adjacent pixel located right to the contour pixel for the weighted-averaging.

As described above, the adjacent pixel located in the opposite direction to the edge direction P is the background contour pixel which is the contour pixel of the background of the object. Thus, by performing the weighted-averaging to the tone values of the object contour pixel with the tone values of the colors in the background contour pixel, from among the tone values of colors included in the object contour pixel, the tone value of object color can be reduced, and also, the tone value of background color can be increased. By reducing the tone value of object color, the object region can be reduced.

When tone values of object contour pixel and background contour pixel are respectively expressed as a[ch] and b[ch] (ch expresses each color of Y, M, C and K), and each tone value of the object contour pixel, which was subjected to the thinning processing, is expressed as $A1[ch]$, the thinning processing section 121 can calculate the tone value $A1[ch]$ by the following expression (1):

$$A1[ch]=a[ch]\times(1-w1)+b[ch]\times w1 \qquad (1)$$

In the above expression (1), w1 expresses the adjustment intensity for adjusting the tone value of object color. As the numerical value of intensity w1 is larger, the proportion of b[ch] in the tone value $A1[ch]$ increases and the decrease amount of a[ch] increases, b[ch] being a tone value of background contour pixel, and a[ch] being a tone value of object contour pixel, that is, the tone value of object color.

When the intensity w1 is 0, $A1[ch]$ is $A1[ch]$=a[ch] and the tone value of object color is maintained. Thus, when the thinning processing is performed to reduce the tone value of object color, the intensity w1 is determined to be a numerical value larger than 0.

The numerical value of intensity w1 corresponds to the number of pixels of the reduced area of object. For example, when w=0.5, A1 is obtained by A1=0.5×a[ch]+0.5×b[ch], and the tone value of object color in the object contour pixel is reduced to half. Thus, the object region is reduced by 0.5 pixel.

The numerical value of intensity w1 can be determined arbitrarily. For example, the intensity w1 can be determined to a numerical value specified by a user, or determined to an optimum numerical value according to the desired image quality, paper type and such like.

The intensity w1 may be classified into a plurality of levels so that the intensity w1 is determined to be the level specified by the user. For example, the intensity w1 can be classified into five levels in the range of 0 to 1 so as to set the first level intensity to w1=0.75, second level intensity to w1=0.60, third level intensity to w1=0.45, fourth level intensity to w1=0.30 and fifth level intensity to w1=0.10.

In a case where the intensity w1 is larger than 1 and the tone value A1[$ch$] is lower than the tone value b[$ch$] of the background color, the thinning processing section 121 sets A1[$ch$]=b[$ch$], and subtracts the tone value corresponding to the difference between A1[$ch$] and b[$ch$] from the tone value of adjacent pixel in the edge direction P of the contour pixel. If the tone value of adjacent pixel also becomes lower than the tone value b[$ch$] of the background color by the subtraction, the thinning processing section 121 repeats the processing of subtracting the tone value corresponding to the difference from the tone value of adjacent pixel in the edge direction P of the adjacent pixel. Thereby, even for the adjacent pixel in the edge direction P of the contour pixel, that is, the pixel of object located inner side of the contour pixel, the tone value of object color can be reduced to make the reduction width of object region to be 1 pixel or more.

When an[$ch$] expresses a tone value of adjacent pixel which is next to the object contour pixel by n pixels in the edge direction P, and A1$n$[$ch$] expresses the tone value after the adjacent pixel was thinned as described above, the tone value A1$n$[$ch$] can be expressed by the following expression (1*):

$$A1n[ch]=an[ch]\times(1-w1+n)+b[ch]\times(w1-1) \quad (1^*)$$

The trapping processing section 122 increases the tone value of background color among the tone values of the colors included in the object contour pixel by performing weighted-averaging to the tone value of object contour pixel with the tone value of adjacent pixel located in the opposite direction to the edge direction P determined by the contour extraction section 11.

Since the adjacent pixel located in the opposite direction to the edge direction P is the background contour pixel, by largely weighting the tone value of background contour pixel at the time of weighted averaging, the tone value of background color can be increased. By increasing the tone value of background color, the background region can be extended.

When the tone values of object contour pixel and background contour pixel are respectively expressed as a[$ch$] and b[$ch$] (ch expresses the colors of Y, M, C and K), and the tone value of each color of object contour pixel after the trapping processing is expressed as A2[$ch$], the trapping processing section 122 can calculate the tone value A2[$ch$] by the following expression (2):

$$A2[ch]=a[ch]\times(1-w2)+b[ch]\times w2 \quad (2)$$

In the above expression (2), w2 expresses the adjustment intensity for adjusting the tone value of background color. As the numerical value of intensity w2 is larger, the proportion of tone value a[$ch$] of object contour pixel in the tone value A2[$ch$] is decreased, and the increase amount of tone value b[$ch$] of background contour pixel, that is, the increase amount of the tone value of background color is increased.

When the intensity w2 is 0, A2[$ch$]=a[$ch$], and the tone value of object color is maintained. Thus, the intensity w2 is determined to be a numerical value larger than 0 in order to increase the tone value of background color by trapping processing.

The numerical value of intensity w2 corresponds to the number of pixels of the extended area of background region. For example, when w=0.7, A2 is calculated as A2=0.3×a[$ch$]+0.7×b[$ch$] and the tone value of background color increases 70% in the object contour pixel. Thus, the background region is extended by 0.7 pixel.

The numerical value of intensity w2 can be determined arbitrarily. For example, the intensity w2 can be determined to a numerical value specified by a user, and determined to be an optimum numerical value corresponding to the desired image quality, paper type and such like. Similarly to the intensity w1, the intensity w2 may be classified into a plurality of levels and the level specified by a user may be determined as the intensity w2.

In a case where the intensity w2 is larger than 1, and the tone value A2[$ch$] exceeds the tone value b[$ch$] of background, the trapping processing section 122 sets A2[$ch$]=b[$ch$], and adds the tone value corresponding to the amount exceeding b[$ch$] to the tone value of adjacent pixel in the edge direction P of contour pixel. In a case where the tone value of the adjacent pixel also exceeds b[$ch$] by the addition, the trapping processing section 122 repeats the processing of adding the tone value corresponding to the amount exceeding b[$ch$] to the tone value of adjacent pixel in the edge direction P of the adjacent pixel. Thereby, it is possible to set the extension width of background region to be one pixel or more by increasing the tone value of background color even for the adjacent pixel in the edge direction P of contour pixel, that is, the pixel of object located inner side of the contour pixel.

By adjusting the intensities w1 and w2, switching can be performed so as to execute only one of thinning processing and trapping processing.

For example, by determining the intensities w1 and w2 so as to satisfy 0<w1 and w2=0, only the thinning processing can be performed.

On the other hand, by determining the intensities w1 and w2 so as to satisfy w1=0 and 0<w2, only the trapping processing can be performed.

By adjusting the intensities w1 and w2, it is possible to switch so as to perform both of the thinning processing and trapping processing, and further, link the increase amount of background color tone value by the trapping processing to the decrease amount of object color tone value by the thinning processing. When an image is formed by electrophotographic method on the basis of image data, the object possibly becomes thicker due to a dot gain phenomenon, crush and splattering of color materials such as toners, and the like. The position gap also possibly occurs when monochromatic images are superposed on each other. However, by the above linking, it is possible to obtain both of the thinning processing effect of suppressing the increase in object thickness and the trapping processing effect of preventing the generation of space between the object and the background due to the position gap.

For example, the trapping processing section 122 can link the intensity w2 to the intensity w1 so that the intensity w2 is constantly larger than the intensity w1 by determining the intensity w2 satisfying 0<w1<w2 on the basis of the intensity w1 used in the thinning processing section 121. Thus, it is possible to set the extension width of background region by the trapping processing to be larger than the reduction width of object region by the thinning processing, and thus, it is possible to overlap (trap) the extended background region on the reduced object region.

For example, the trapping processing section 122 can determine the intensity w2 for adjusting the tone value of background color by trapping processing to be the total of intensity w1, which is the intensity for adjusting the tone value of object color by the thinning processing section 121, and the intensity of overlapping the object region and the background region. The intensity of overlapping indicates the size of range where the object region and the background region overlap each other. When the intensity of overlapping is expressed as γ (gamma), the calculation expression of adjustment intensity w2 can be expressed by the following expression (3):

$$w2=w1+\gamma \qquad (3)$$

The numerical value of intensity γ can be arbitrarily determined as long as it is larger than 0. Since the numerical value of intensity γ corresponds to the number of pixels in the overlapping range of the object region and the background region, the overlapping range of the object region and the background region can be freely adjusted by determining the number of pixels of the overlapping regions as the intensity γ. For example, the object region and the background region can overlap by one pixel width by determining the intensity γ to γ=1, and the object region and the background region can overlap by two pixel width by determining the intensity γ to γ=2.

The trapping processing section 122 can determine the numerical value of intensity γ to be a numerical value specified by a user, and to be an optimum numerical value according to the desired image quality, paper type and such like.

The trapping processing section 122 can change the intensity γ as needed by determining the intensity γ by the object, for example. However, the trapping processing section 122 can also maintain a constant intensity γ. Thus, it is possible to maintain a constant overlapping width of the object and background regions.

For example, it is possible to extend the background region so that the object region subjected to the thinning processing and the background region subjected to the trapping processing overlap each other constantly by one pixel width by constantly determining the intensity γ to γ=1.

Figure 4A:
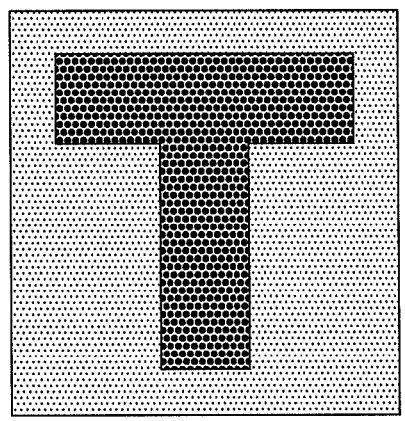
FIG. 4A is a view showing an original image which was generated by knockout according to one or more embodiments.

FIG. 4A shows an example of an original image which was generated by knockout and formed of a character object in black and a background in cyan.

Figure 4B:
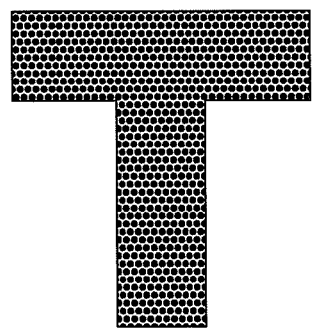
FIG. 4B is a view showing an object of a character which was extracted from the original image shown in FIG. 4A.
Figure 4C:
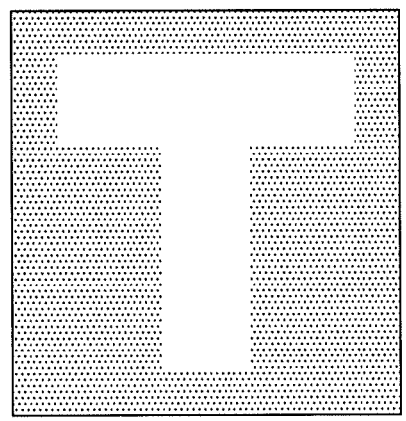
FIG. 4C is a view showing a background which was extracted from the original image shown in FIG. 4A.

FIGS. 4B and 4C respectively show the object image and the background image extracted from the original image shown in FIG. 4A.

FIG. 5 shows processing results of the original image shown in FIG. 4A obtained respectively when only the thinning processing was performed, when only the trapping processing was performed, and when both of the thinning processing and the trapping processing were performed and further the increase amount of background color tone value by the trapping processing was linked to the decrease amount of the object color tone value by the thinning processing.

As shown in FIG. 5, when only the thinning processing is performed, since the black color tone value is reduced, the increase in character thickness at the time of image formation can be suppressed. However, since the background region is not extended whereas the object region is reduced, space is generated between the object and the background.

When only the trapping processing is performed, since the cyan tone value is increased, the object and the background overlap, and thus, space is not generated. However, since the object region is not reduced, the increase in character thickness at the time of image formation cannot be suppressed.

On the other hand, when both of the thinning processing and the trapping processing are performed, not only the reduction of object region but also the extension of background region is performed, and the reduction range is linked to the extension. As a result, the reduced object region and the extended background region can overlap each other, and it is possible to suppress the increase in thickness of character and also prevent the generation of space.

The γ correction section 13A performs γ correction for object contour pixels to the multiple tone image data for which tone values were adjusted by the contour processing section 12.

The γ correction section 13B performs γ correction for pixels other than the contour pixels to the multiple tone image data for which tone values were adjusted by the contour processing section 12.

The γ correction is processing of tone value correction for each pixel so that the density characteristic of formed image match the target density characteristic when the image is formed on a sheet by the image forming apparatus on the basis of the image data.

The γ correction sections 13A and 13B obtain tone values after correction by using conversion tables determining corrected tone value for each tone value. Since the density characteristic of the formed image is different between the object contour pixels and the pixels other than the contour pixel, conversion tables respectively corresponding to the contour pixels and the other pixels are used. The conversion tables can be determined by density distribution of a test image, the density distribution being obtained when halftone processing is performed by the halftone processing sections 14A and 14B to the test image of gradation having tone values which vary gradually and the processed image is formed on a sheet by the image forming apparatus.

The halftone processing section 14A converts the tone value in 256 tone level of each pixel to the tone value in 2 tone level by performing halftone processing to image data to which γ correction was performed by the γ correction section 13A.

The halftone processing section 14B converts the tone value in 256 tone level of each pixel to the tone value in 2 tone level by performing halftone processing to image data to which γ correction was performed by the γ correction section 13B.

Since the density characteristic of the formed image is different between the object contour pixels and the pixels other than the contour pixels, the halftone processing sections 14A and 14B perform halftone processing by different processing conditions, for example, by using threshold values respectively corresponding to the density characteristics. The halftone processing may be, for example, error diffusion processing or dithering processing of converting a tone value into a binary or multivalued value by obtaining a threshold value corresponding to the position of each pixel from the threshold value matrix and comparing the threshold value with the tone value of the pixel.

The output selecting section 15 selects image data which was output from the halftone processing section 14A for the contour pixels extracted by the contour extraction section 11 among pixels of image data, and selects image data which was output from the halftone processing section 14B for pixels other than the contour pixels.

As described above, the image processing apparatus 1 in certain embodiments includes: a contour extraction section 11 which extracts a contour pixel of an object from pixels of image data having tone values of a plurality of colors for each pixel; and a contour processing section 12 which executes thinning processing of adjusting an object color tone value from among the tone values of the colors in the object contour pixel extracted by the contour extraction section 11 and trapping processing of adjusting a background color tone value which is a tone value of a background color of the object. The contour processing section 12 links the adjustment amount of tone value by the trapping processing to the adjustment amount of tone value by the thinning processing.

By the thinning processing, the object region can be reduced, and the increase in object thickness due to the dot gain phenomenon and such like at the time of image formation can be suppressed. Even when the object region is reduced, by performing the trapping processing, the background region can be extended and further the extension width of background region can be linked to the reduction width of object region. Thus, it is possible to overlap the background region on the reduced object region. The trapping processing can be performed without losing the effect of thinning processing, and thus, it is possible to obtain both effects of the thinning processing and the trapping processing.

The above embodiments are examples of the present invention, and thus, the present invention is not limited to this. Modifications can be appropriately made within the scope of the present invention.

For example, when the thinning processing is performed for a thin line having a line width of a few pixels, break of line and such like possibly occurs. In order to prevent image quality deterioration due to such excess thinning processing, as an exception, the tone value of object color is increased for the object contour pixel in the thinning processing to extend the object region (increase the thickness of line) in some cases.

In a case of extending the object region by thinning processing, the adjustment amount of background color tone value by the trapping processing may be linked to the adjustment amount of object color tone value by the thinning processing.

In a case of extending the object region, overlapping of the regions can be achieved without performing the trapping processing since the object and background regions overlap by the extension. However, by linking the adjustment amounts, it is possible to adjust the overlapping range of the regions and avoid the excess overlapping.

In a case of extending the object region in the thinning processing, the thinning processing may be performed so as to increase the object color tone value among the tone values of colors in the adjacent pixel located in the opposite direction to the edge direction P of the object contour pixel, that is, the background contour pixel. Trapping processing may be performed so as to reduce the tone value of background color. Since the target to adjust the tone value by the contour processing section 12 is changed to the background contour pixel, the γ correction section 13A and the halftone processing section 14A perform image processing for the background contour pixel. The output selecting section 15 selects image data which was output by the halftone processing section 14A for the background contour pixel.

By making a computer such as a CPU (Central Processing Unit) read a program describing the above-mentioned processing contents of the image processing apparatus 1, the processing procedures can be executed by the computer such as the CPU.

As a computer readable medium of program, a non-volatile memory such as a ROM and a flash memory, and a portable recording medium such as a CD-ROM can be applied. As a medium providing program data via a communication line, a carrier wave is also applied.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image processing apparatus comprising:
   a contour extraction section that extracts a contour pixel of an object from pixels in image data that has tone values of a plurality of colors for each of the pixels; and
   a contour processing section that executes
      thinning processing of adjusting a tone value of an object color of the object and trapping processing of adjusting a tone value of a background color that is a color of a background of the object among tone values of colors in the contour pixel of the object which is extracted by the contour extraction section or tone values of colors in a contour pixel of the background of the object, wherein
   the contour processing section links an adjustment amount of the tone value of the background color by the trapping processing to an adjustment amount of the tone value of the object color by the thinning processing.

2. The image processing apparatus of claim 1, wherein
   in a case where the contour processing section decreases the tone value of the object color among the tone values of the colors in the contour pixel of the object by the thinning processing, the contour processing section increases the tone value of the background color among the tone values of the colors in the contour pixel of the object by the trapping processing, and links an increase amount of the tone value of the background color to a decrease amount of the tone value of the object color.

3. The image processing apparatus of claim 1, wherein
   in a case where the contour processing section increases the tone value of the object color among the tone values of the colors in the contour pixel of the background by the thinning processing, the contour processing section decreases the tone value of the background color among the tone values of the colors in the contour pixel of the background by the trapping processing, and links a decrease amount of the tone value of the background color to an increase amount of the tone value of the object color.

4. The image processing apparatus of claim 1, wherein
   the contour processing section determines, as an adjustment intensity of the tone value of the background color by the trapping processing, a total of an adjustment intensity of the tone value of the object color by the thinning processing and an overlapping intensity of an object region and a background region.

5. The image processing apparatus of claim 4, wherein
   the contour processing section sets the overlapping intensity of the object region and the background region to be constant.

6. A non-transitory computer readable recording medium that stores a program that makes a computer execute a processing procedure, the processing procedure comprising:
- extracting a contour pixel of an object from pixels in image data that has tone values of a plurality of colors for each of the pixels; and
- executing thinning processing of adjusting a tone value of an object color of the object and trapping processing of adjusting a tone value of a background color that is a color of a background of the object among tone values of colors in the contour pixel of the object which is extracted by the extracting or tone values of colors in a contour pixel of the background of the object, wherein
- in the executing of the thinning processing, an adjustment amount of the tone value of the background color by the trapping processing is linked to an adjustment amount of the tone value of the object color by the thinning processing.

* * * * *